United States Patent
Min et al.

(10) Patent No.: US 7,260,572 B2
(45) Date of Patent: Aug. 21, 2007

(54) METHOD OF PROCESSING QUERY ABOUT XML DATA USING APEX

(75) Inventors: Jun-Ki Min, Daejeon (KR); Kyuseok Shim, Seoul (KR); Chin-Wan Chung, Seoul (KR)

(73) Assignee: Korea Advanced Institute of Science and Technology (KR)

( * ) Notice: Subject to any disclaimer, the term of this patent is extended or adjusted under 35 U.S.C. 154(b) by 335 days.

(21) Appl. No.: 10/453,682

(22) Filed: Jun. 2, 2003

(65) Prior Publication Data
US 2004/0098384 A1    May 20, 2004

(30) Foreign Application Priority Data
Nov. 14, 2002  (KR) ...................... 10-2002-0070634

(51) Int. Cl.
G06F 17/30 (2006.01)

(52) U.S. Cl. .............................................. 707/5; 707/2

(58) Field of Classification Search .................... 707/2, 707/8, 10, 102, 103 R, 9, 101; 709/231
See application file for complete search history.

(56) References Cited

U.S. PATENT DOCUMENTS

| | | | | |
|---|---|---|---|---|
| 6,141,655 A * | 10/2000 | Johnson et al. | ................. | 707/2 |
| 6,192,371 B1 * | 2/2001 | Schultz | ................... | 707/103 R |
| 6,356,906 B1 * | 3/2002 | Lippert et al. | ................. | 707/10 |
| 6,418,446 B1 * | 7/2002 | Lection et al. | .......... | 707/103 R |
| 6,480,860 B1 * | 11/2002 | Monday | ..................... | 707/102 |
| 6,571,292 B1 * | 5/2003 | Fletcher | ....................... | 709/231 |
| 6,804,677 B2 * | 10/2004 | Shadmon et al. | ........... | 707/101 |
| 6,910,040 B2 * | 6/2005 | Emmick et al. | ................ | 707/8 |
| 2003/0212662 A1 * | 11/2003 | Shin et al. | ...................... | 707/2 |

OTHER PUBLICATIONS

Chung, CW., Min, JK. and Shim, K (2002). "APEX: An Adaptive Path Index for XML Data". Proceedings of ACM SIGMOD 2002, Madison, Wisconsin, Jun. 3-6, pp. 121-132. ACM Press New York, NY, USA.□□*
Yoshikawa, M., Amagasa, T., Shimura, T. & Uemura, S. (2001), "XRel: a path-based approach to storage and retrieval of XML documents using relational databases", TOIT 1(1), 110-141.□□*
Jason McHugh and Jennifer Widom. "Query optimization for XML", In The VLDB Journal, pp. 315-326, 1999.□□*
An article entitled "APEX: An Adaptive Path Index for XML Data", By Chung et al., published (2002).

* cited by examiner

*Primary Examiner*—Apu Mofiz
*Assistant Examiner*—Paul Kim
(74) *Attorney, Agent, or Firm*—Bachman & LaPointe, P.C.

(57) ABSTRACT

A method of processing a query about an Extensible Markup Language (XML) data. The XML query processing method includes the first step of representing the XML data in the form of an XML graph, the second step of creating and updating an Adaptive Path indEX (APEX) based on frequently used paths extracted from previously processed XML queries and the XML graph, and the third step of processing an XML query using the APEX. The XML query processing is capable of improving the performance of processing the query by extracting frequently used paths from path expressions having been used as queries for XML data and updating the APEX through the use of the frequently used paths.

6 Claims, 12 Drawing Sheets

```
<MovieDB>
    <actor id = "a1">
        <name> actor1 </name></actor>
    <actor id = "a2" ,movie ="m1">
        <name> actor2 </name></actor>
    <director id = "d1">
        <name> director1 </name>
        <movie id = "m1" director = "d1">
            <title> movie2 </title></movie></director>
    <director id = "d2">
        <name> director2 </name></director>
    <movie id = "m2" actor = "a1" , director ="d2">
        <title> movie1 </title></movie>
</MovieDB>
```

| label | count | new | xnode | next |
|---|---|---|---|---|
|  |  |  |  |  |

Fig. 6

Procedure buildAPEX0(*root*)
begin
1.   *xnode* := *hash*('xroot')
2.   *xnode*.extent := { <NULL,*root* >}
3.   exploreAPEX0(*xnode*, *xnode*.extent)
end

Procedure exploreAPEX0(*x*, △ESet)
begin
1.   ESet := ∅
2. for each <*u,v*> ∈ △ESet do
3.     ESet := ESet ∪ {*o* | *o* is an outgoing edge from *v*}
4. for each unique label *l* in ESet do {
5.     *y* := hash (*l*)
6.   if (*y* = NULL) {
7.       *y* := *newXNode*()
8.       insert *y* into hash table
9.   }
10.   make_edge(*x*, *y*, *l*)
11.   △newESet := a set of edges having *l* in ESet - *y*.extent
12.   *y*.extent := *y*.extent ∪ △ newESet
13.   exploreAPEX0(*y*, △newESet)
14. }
end

Fig. 7

| label | xnode |
|---|---|
| *xroot* | &0 |
| MovieDB | &1 |
| actor | &2 |
| director | &3 |
| movie | &8 |
| name | &9 |
| title | &4 |
| @movie | &5 |
| @director | &6 |
| @actor | &7 |

Fig. 8

Procedure frequentlyUsedPathExtraction ()
begin
1. reset all count fields to 0 and new fields to FALSE
2. frequency Count()
3. pruning $H_{APEX}$ (HashHead)

end

Function pruning$H_{APEX}$ (hnode)
begin
1. is_empty := FALSE
2. if hnode = NULL return is_empty
3. for each entry $t \in$ hnode do {
4.    if ($t.count$ < minsup) {
5.       $t.next$ := NULL
6.       if ($t \notin$ HashHead) {
7.          is_empty := $hnode$.delete(t)
8.       }
9.    } else {
10.     if (pruning $H_{APEX}$ ($t.next$)= TRUE)
11.        $t.next$ := NULL
12.     if ($t.next \neq$ NULL) and ($t.xnode \neq$ NULL)
13.        $t.xnode$ := NULL
14.     if ($t.new$ = TRUE) and ($hnode.remainder.xnode \neq$ NULL)
15.        $hnode.remainder$ = NULL
16.    }
17. }
18. return is_empty
end

Fig. 9

Procedure updateAPEX($xnode$, $\triangle$ESet, $path$)
begin
1.  if ($xnode$.visited = TRUE) and ($\triangle$ESet = ∅) return
2.  $xnode$.visited := TRUE
3.  EdgeSet := ∅
4.  if $\triangle$ESet = ∅ {
5.     for each $e$ that is an outgoing edge of $xnode$ do {
6.        newpath := $concatenate(path, e$.label)
7.        $xchild$ := $lookup$(newpath)
8.        if ($xchild$ = NULL) $xchild$ := $new XNode$()
9.        if ($xchild$ != $e$.end) {
10.          if (EdgeSet = ∅) {
11.             for each $<u, v>$ ∈ $xnode$.extent do
12.                EdgeSet := EdgeSet ∪ {$o$ | $o$ is an outgoing edge from $v$}
13.          }
14.          subEdgeSet := a set of edges with the label $e$.label in EdgeSet
15.          $\triangle$EdgeSet := subEdgeset - $xchild$.extent
16.          $xchild$.extent := $xchild$.extent ∪ $\triangle$EdgeSet
17.          make_edge($xnode, xchild, e$.label)
18.          hash.append(newpath , $xchild$)
19.       }
20.       else $\triangle$EdgeSet := ∅
21.       updateAPEX($xchild$, $\triangle$EdgeSet , newpath)
22.    }
23. } else {
24.    for each $<u, v>$ ∈ $\triangle$ESet do
25.       EdgeSet := EdgeSet ∪ {$o$ | $o$ is an outgoing edge from $v$}
26.    for each unique label $l$ in EdgeSet do {
27.       newpath := $concatenate(path, e$.label)
28.       $xchild$ := $lookup(newpath)$
29.       if ($xchild$ = NULL) $xchild$ := $new XNode$()
30.       subEdgeSet := set of edges labeled $l$ in EdgeSet
31.       $\triangle$EdgeSet := subEdgeset - $xchild$.extent
32.       $xchild$.extent := $xchild$.extent ∪ $\triangle$EdgeSet
33.       make_edge($xnode, xchild, l$)
34.       hash.append(newpath , $xchild$)
35.       updateAPEX($xchild$, $\triangle$EdgeSet , newpath)
36.    }
37. }
end

METHOD OF PROCESSING QUERY ABOUT XML DATA USING APEX

BACKGROUND OF THE INVENTION

1. Field of the Invention

The present invention relates to an index structure capable of allowing users to effectively retrieve data represented by extensible markup language (see T. Bray, J. Paoli, C. M. Sperberg-McQueen, and E. Maler. Extensible Markup Language (XML) 1.0 (second edition). W3C) that is the de facto standard for the representation and exchange of data on the Internet, and a method of managing the same, and more particularly to a method of processing XML queries using an adaptive path index, which utilizes frequently used paths. Thus, the query performance for XML data can be significantly improved and storage space can be reduced compared with conventional path indexes.

2. Description of the Prior Art

The emergence of the Internet has dramatically increased the amount of data of all kinds available electronically. To overcome the limitations of Hyper Text Markup Language (HTML) and solve the complexity of Standard Generalized Markup Language (SGML), extensible Markup Language (XML) was proposed by the World Wide Web Consortium (W3C) in 1998.

XML can describe a wide range of data, from regular to irregular, from flat to deeply nest, and tree shaped to graph shaped structure. Due to the flexibility of XML, XML is rapidly emerging as the de facto standard for the representation and exchange of data on the next generation Web application.

Various query languages for retrieving data represented in XML have been proposed. XML query languages, such as XPath (see J. Clark and S. DeRose. XML path language (Xpath) version 1.0. W3C Recommendation) and XQuery (see S. Boag, C. Chamberlin, M. Fernandez, D. Florescu, J. Robie, J. Simeon, and M. Stefanescu. Xquery 1.0: An XML query language. Working draft), use path expressions to traverse an irregular structure consisting of XML elements. Thus, the navigation of irregularly structured XML data is one of essential components for processing XML queries. Since the elements may be scattered at different location in the disk, the performance of processing an XML query results in significant degradation. Furthermore, when an XML query consisting of a partial matching path expression is processed, all elements constituting XML data must be traversed, which is very inefficient.

Meanwhile, a structural summary and a path index speed up the XML query evaluation by allowing only the relevant portions of XML data to be traversed with respect to a given path expression. As a result, structural summary extraction and path index generation techniques have received a lot of attention as schemes of improving the XML query performance. Goldman and Widom developed a path index that is called "strong DataGuide" (see R. Goldman and J. Widom. DataGuides: Enable query formulation and optimization in semistructured database. VLDB 1997.). This index was proposed to extract the structural information of Semi-structural data such as XML data, and records simple paths starting from a root element without overlapping. The building algorithm of the strong DataGuide emulates an algorithm for converting Non-deterministic Finite Automata (NFA) into Deterministic Finite Automata (DFA)(see J. E. Hopcraft and J. D. Ullman. Introduction to Automata Theory, Language, and Computation. 1979). Accordingly, this scheme is problematic in that, in the case where given XML data has a complicated graph structure, the size of the strong DataGuide may become larger than that of original XML data.

Milo and Suciu proposed another index called "1-Index" (see T. Milo and D. Suciu. Index structures for path expression. ICDT. 1999). 1-Index is identical with strong DataGuide in that information of all paths is maintained. 1-Index generates indexes using backward stimulation and backward simulation which are originated from the graph verification area. This method is that two nodes are integrated into a single node when the two nodes exist and two path sets starting from the two nodes are identical with each other. This method allows a graph, such as a non-deterministic finite automata, to be obtained, unlike strong DataGuide. However, when a given input graph takes a tree form, 1-Index and strong DataGuide are identical with each other. Accordingly, 1-Index can be considered a non-deterministic variation of strong DataGuide.

In the field of object-oriented database, to support frequently used reference chains between two object instances, Access Support Relation (ASR) has been used (see A. Kemper and G. Moerkotte. Access support relations: An indexing method for object bases. Information Systems, 17(2): 117-145, 1992). However, ASR materializes the reference chains of arbitrary lengths, and is problematic in that it can support only predefined subset of paths.

Cooper et al. proposed Index Fabric that is conceptually similar to strong DataGuide in that all paths starting from a root element are maintained (see B. Cooper, N. Sample, M. J. Franklin, G. R. Hjaltason, and M. Shadmon. A fast index for semistructured data. VLDB. 2001). Index Fabric encodes the paths of elements having data values to be converted into strings, and maintains them using a string index, such as Patricia Trie. However, Index Fabric is disadvantageous in that a parent-child relationship among elements cannot be maintained. Accordingly, Index Fabric is ineffective in partial matching path expressions that must employ a parent-child relationship.

Many queries on XML Data have the partial matching path expressions because user of XML data does not take the structure of the data into account, and intentionally uses a partial matching path expression so as to obtain desired results. The above-described XML path indexes, such as strong DataGuide, 1-Index, Index Fabric, etc., record all paths starting from a root element, so the index must be exhaustively traversed, thus deteriorating performance. Furthermore, these path indexes are generated only through the use of data. Thus, they do not take advantage of query workload to effectively process frequently used path expressions.

SUMMARY OF THE INVENTION

Accordingly, the present invention has been made keeping in mind the above problems occurring in the prior art, and an object of the present invention is to provide a method of processing a query for XML data having an irregular structure using an Adaptive Path indEX for XML data (APEX), which is capable of improving the performance of processing the query by extracting frequently used paths from path expressions having been used as queries for XML data and updating the APEX using the frequently used paths.

In order to accomplish the above object, the present invention provides a method of processing a query about XML data, comprising the first step of representing the XML data in the form of an XML graph; the second step of creating and updating an Adaptive Path indEX for XML data (APEX) based on frequently used paths extracted from previously processed XML queries and the XML graph; and the third step of processing an XML query using the APEX.

In contrast to the traditional indexes such as Data Guide and 1-Index, the APEX of the present invention does not maintain all paths starting from a root element, but utilizes frequently used paths to improve the performance of processing a query. Further, the existing path indexes are constructed through the use of only XML data, while the method of the present invention extract paths frequently used from query workloads in a data mining manner and utilizes the frequently used paths.

Specifically, the APEX and the method of processing a query in accordance with the present invention are characterized by providing a method having the following solutions.

(1) An APEX consists of a hash tree and a graph structure. The hash tree maintains information on the incoming paths of the nodes of the graph structure, so a partial matching path expression can be effectively processed by traversing the hash tree.

(2) In order to extract information on frequently used paths, a concept used in a sequential pattern mining technique is utilized.

(3) The APEX of the present invention achieves a size smaller than the existing path indexes by maintaining an index structure using frequently used paths.

(4) The APEX of the present invention reduces the overhead of creating and managing indexes in such a way that the index is changed by finding changed frequently used paths when the frequently used paths are changed.

BRIEF DESCRIPTION OF THE DRAWINGS

The above and other objects, features and advantages of the present invention will be more clearly understood from the following detailed description taken in conjunction with the accompanying drawings, in which:

FIG. 9 is a view showing an algorithm of updating the APEX;

DESCRIPTION OF THE PREFERRED EMBODIMENTS

Reference now should be made to the drawings, in which the same reference numerals are used throughout the different drawings to designate the same or similar components.

Figure 1:
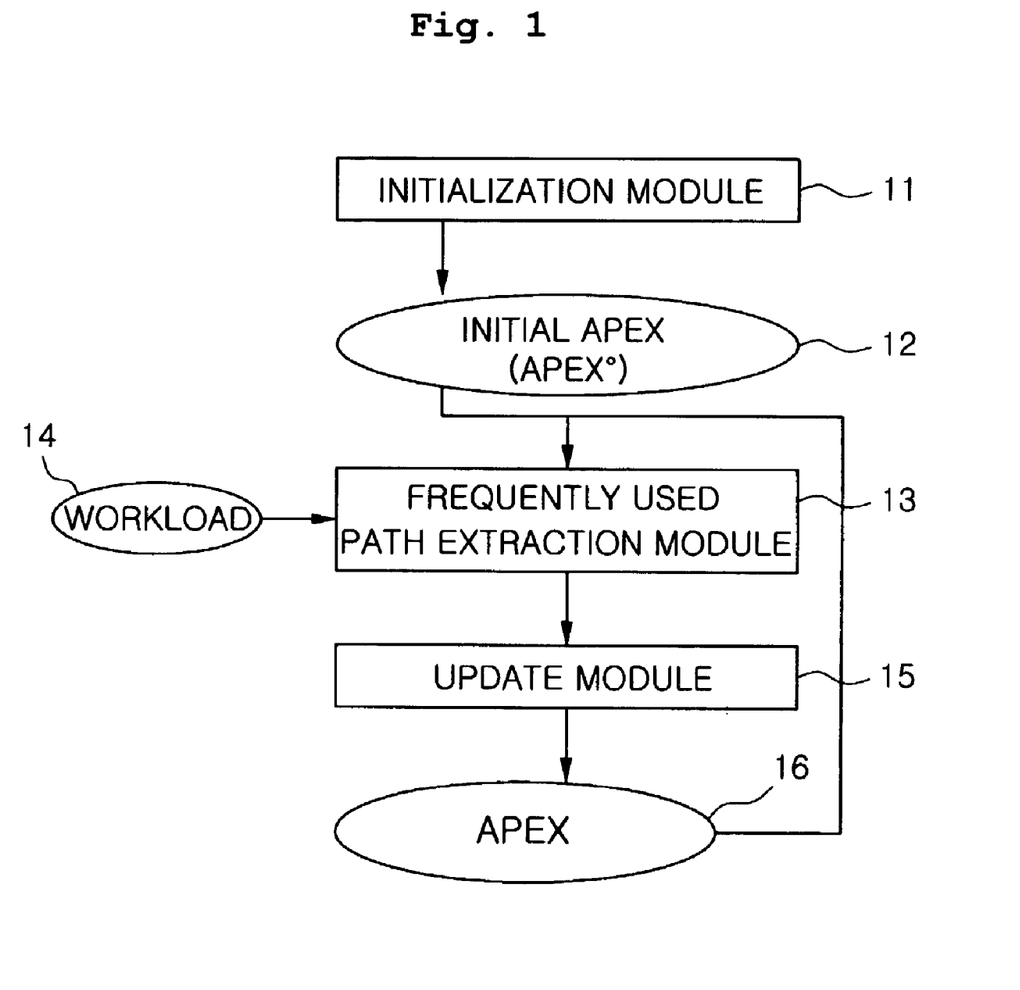
FIG. 1 is a view showing a structure for managing an APEX according to the present invention.

FIG. 1 is a view showing a structure for managing an APEX according to the present invention. As shown in FIG. 1, an APEX management module chiefly includes three modules, including an initialization module 11, a frequently used path extraction module 13 and an update module 15. The initialization module 11 is a module that is used to initially create an APEX without query workloads only when APEX is built first. That is, this initialization module 11 creates an initial APEX $APEX^0$ 12 that is the initial form of the APEX. The initial APEX $APEX^0$ is a simplest one, and used as a seed to build a more sophisticated APEX. The path extraction module 13 and the update module 15 are modules that use a workload 14, that is, a collection of queries using a current APEX, and are used to more effectively create an APEX 16 using frequently used paths. In this case, the workload 14 consists of a collection of single path expressions in the form of $1_i.1_{i+1}.\ldots.1_{j+1}.1_j$. The path extraction module 13 and the update module 15 are repeatedly performed whenever the workload 14 is changed.

Hereinafter, the structure of XML data used in the present invention is described in brief, and the structure of the APEX proposed in the present invention is described based on the description of the structure of XML data. Thereafter, the method of managing an APEX is described.

Figure 2:
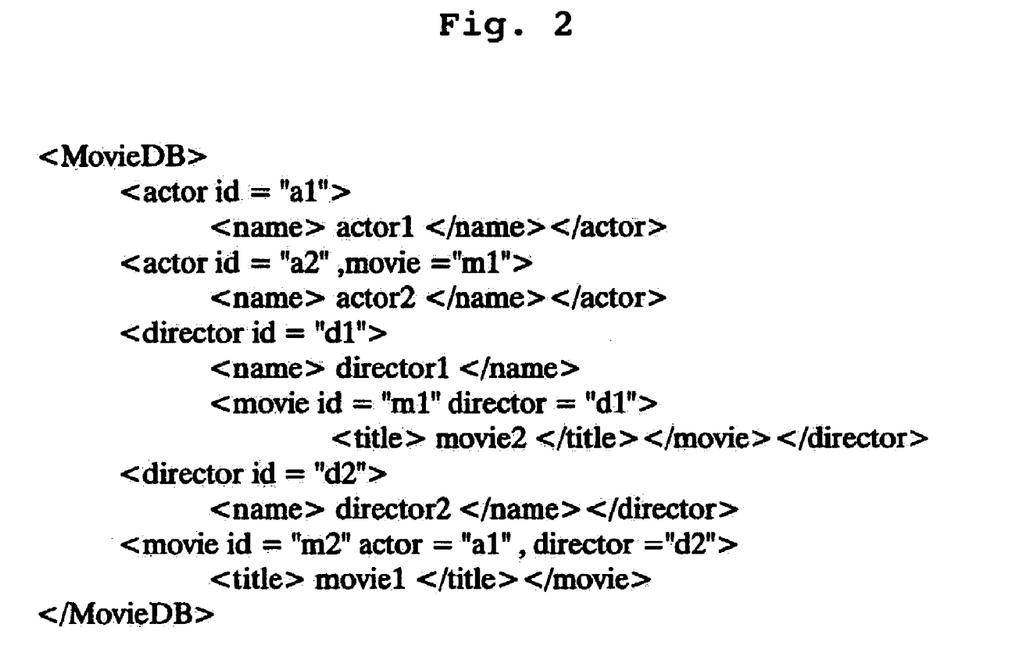
FIG. 2 is a view showing an example of XML data.
Figure 3:
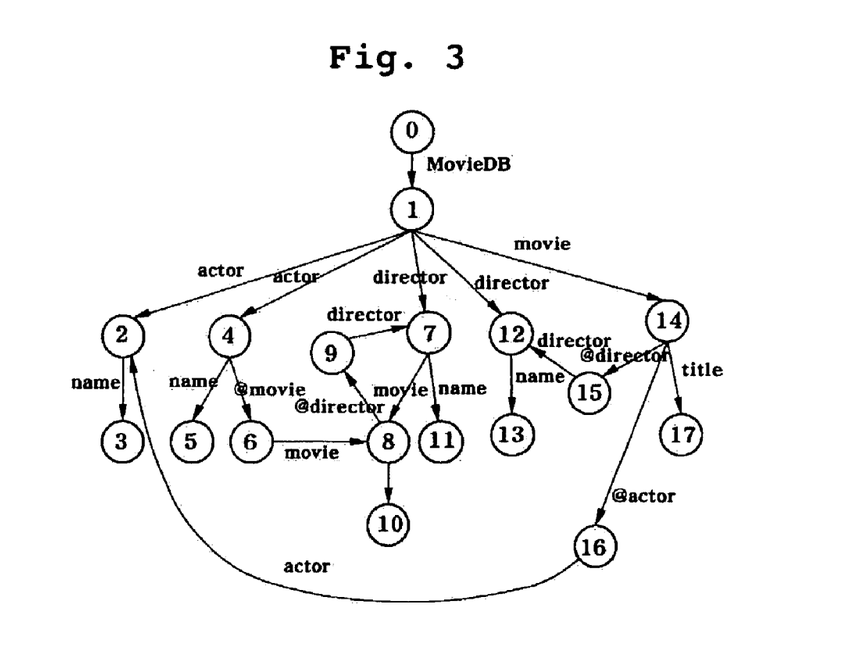
FIG. 3 is an XML graph showing the structure of the XML data.

FIG. 2 is a view showing an example of the XML data. The structure of the example can be represented by a label-edge graph as illustrated in FIG. 3, which is referred to as an XML graph. An ID-IDREF relationship shown in FIG. 3 is represented by an edge extending from an IDREF type node to a node that represents an element having an ID type attribute corresponding to the IDREF type node. The label of the edge has the label of a corresponding element. The label of an edge indicating a node for an IDREF type element starts with "@".

On the XML graph, paths that are each formed by a succession of labels exist, and are used as path expressions. The following relationship can exist between the paths. If the relationship shown in the following Definition 1 exists between random paths A and B, it is stated that "the path B includes in the path A."

Definition 1

If the relationship, $a_1=b_i$, $a_2=b_{i+1}$, ..., and $a_n=b_{i+n-1}$, $1 \leq i$, and $i+n-1 \leq m$ exists between a path $A=a_1.a_2.\ldots.a_n$ and a path $B=b_1.b_2.\ldots.b_m$, it is stated that "the path A is included in the path B" or "the path A is a subpath of the path B". Further, if the path A is a subpath of the path B and $m=i+n-1$, the path A is a suffix of the path B.

Additionally, a frequency at which a path p on the XML graph is used in given XML path expressions is referred to as a support of the path "p", and is represented as the following Equation 1.

$$sup(p)=|Q|/|W| \qquad (1)$$

where $|W|$=the number of given path expressions, and $|Q|$=the number of path expressions each including the path "p".

In the method of managing an APEX in accordance with the present invention, required paths defined in the following Definition 2 are extracted and the APEX is managed using the required paths.

Definition 2

If a support of the path "p" existing on an XML graph sup(p) is greater than a user-specified minimum support minSup, or the length of the path p is 1, the path p is referred to as a required path. A path having a support greater than the user-specified minimum support minSup is referred to as a frequently used path.

An edge set T(p) with respect to a path "p" is defined as the following Definition 3.

Definition 3

When $P=1_i. \ldots .1_{j-1}.1_j$, $T(p)=\{<o_{j-1},o_j>|o_{i-1}.1_i.o_i. \ldots 1_j, o_j\}$ where $o_{k-1}$ and $o_k$ are nodes existing on the XML graph with respect to a label $1_k$ shown on the path p, and an edge having the label $1_k$ extending from $o_{k-1}$ to $o_k$ exists on the XML graph.

When the path p is the suffix of the path q from the Definition 3, it can be appreciated that $T(p) \supseteq T(q)$. For example, on the graph of FIG. 3, a path name is a suffix of a path actor.name. In this case, it can be appreciated that T(name)={<2, 3>, <4, 5>, <7, 11>, <12, 13>} and T(actor.name)={<2, 3>, <4, 5>}. Accordingly, it can be appreciated that $T(name) \supseteq T(actor.name)$. It requires an excessive storage resources to manage sets of edges T(p) with respect to all paths falling within a set of required paths. Accordingly, in the present invention, an extent of a path "p" is defined as described in the following definition 4 and is managed.

Definition 4

It is assumed that the set of some of the paths of an XML graph starting from a root is $Q_{XML}$ and the set of required paths is R. With respect to a path p, it is assumed that $Q_G(P)=\{1|1 \in Q_{XML}$ and p is a suffix of 1$\}$ and $Q_A(p)=\{1|1 \in Q_{XML}$ and every path q ($\neq p$) $\in$ R having p as a suffix is a suffix of 1$\}$. If $Q(p)=Q_G(p)-Q_A(p)$, the extent E(p) is defined as $\cup_{r \in Q(p)} T(r)$.

When q with respect to a random path p is a path having p as a suffix, it can be appreciated that $T(p)=\cup_{\forall q} E(q)$.

For example, when it is assumed that actor.name is a frequently used path with respect to the XML graph of FIG. 3, it can be appreciated that E(name)={<7, 11>, <12, 13>}, E(actor.name)={<2, 3>, <4, 5>} and T(name)=E (name) ∪E (actor.name).

Figure 4:
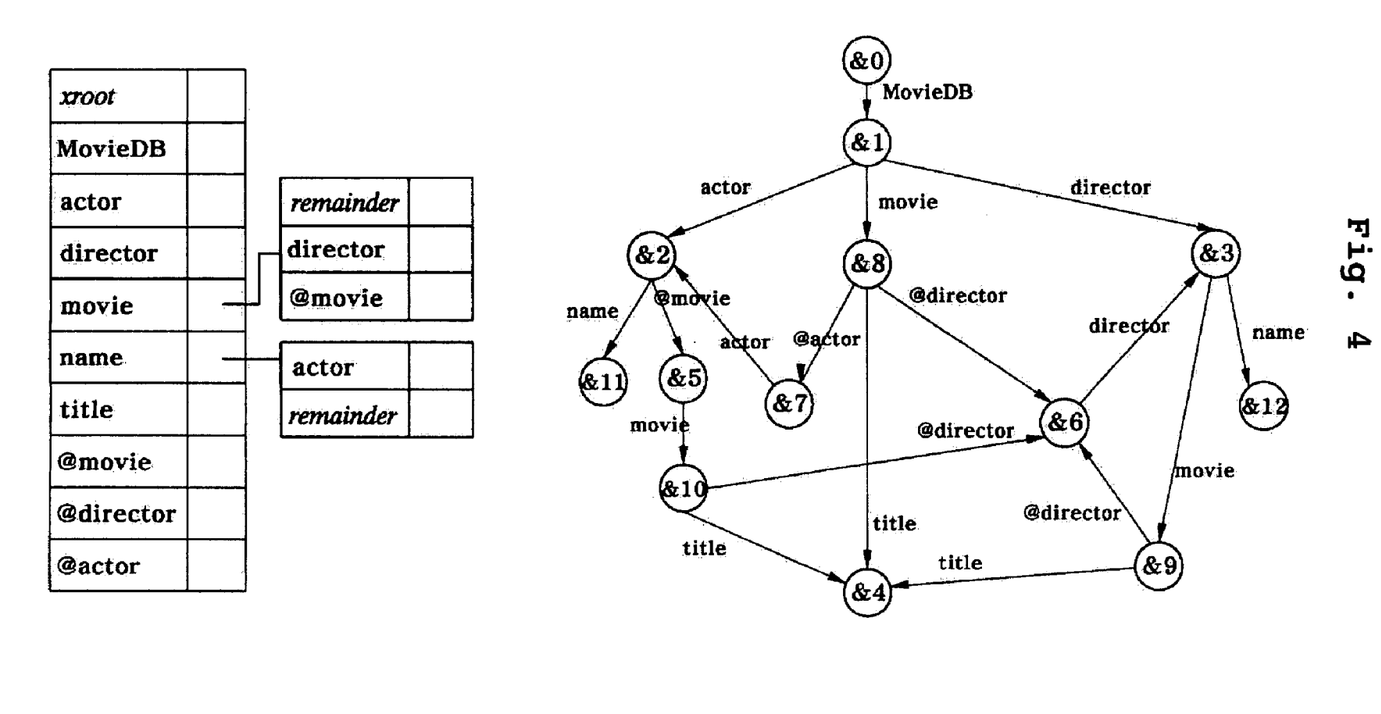
FIG. 4 is a view showing an example of the APEX.

FIG. 4 shows an APEX when required paths for FIG. 3 are all paths each having a length of 1 and direct.movie, @movie.movie, actor.name. This drawing illustrates the index having a graph structure, and may be further provided with a hash tree to support more effective lookups.

Figure 5:
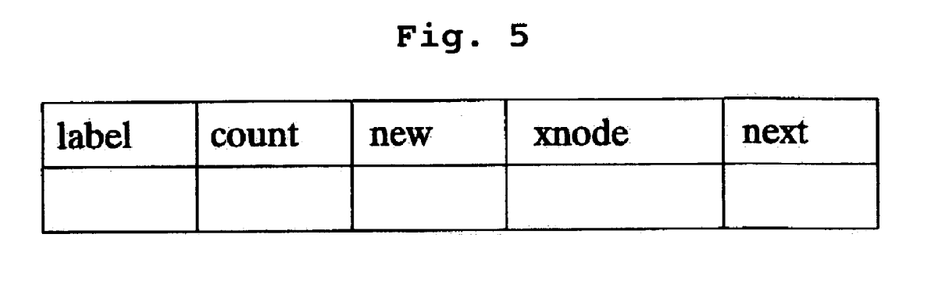
FIG. 5 is a view showing a hash table of a hash tree for the APEX.

A hash tree maintains information on required paths, and maps the nodes of the graph structure to the required paths. Each node of the hash tree is provided with a hash table, and each entry of the hash table consists of five fields as shown in detail in FIG. 5. In this drawing, "label, count, new, xnode and next" become the key values of the entry. The "count" field represents the frequency of use of a path represented by a corresponding entry, that is, the support of the path. The "new" field represents whether a corresponding entry is newly created. The "xnode" field represents a single node existing on the graph structure of the APEX. Finally, the "next" field represents a next node in the hash tree.

The graph structure provides information on the structural summary of a given XML graph, the nodes of the graph structure are mapped to the entries of the hash tree in a 1:1 correspondence, and the nodes of graph structure have the extents of required paths represented by the entries of the hash tree. Additionally, if $t_x=s_y$ with respect to two random nodes x and y of the graph structure, an edge $<s_x, t_x>$ falling within the extent of x and an edge $<s_y, t_y>$ falling within the extent of y, an edge extending from the node x to the node y of the graph structure exists. Further, a label used to group edges falling within y is used as the label of the edge. Especially for the root node of the XML graph, a node is created on the initial APEX and a virtual edge consisting of <null, root node> is stored as the extent of a corresponding node. Further, this node is expressed as xroot for convenience. Further, when a path q having p as a suffix with respect to a random path p is a frequently used path and E(p) is not a null set, E(p) is managed by creating an entry "remainder" and a corresponding node. For example, in FIG. 4, E(name) is stored in a node &12, which is registered in an entry "reminder" of a lower node downstream of an entry "name" of a root node in a hash tree.

In FIG. 4, information on a required path direct.movie can be obtained by looking up the information in the hash tree in a reverse direction. For example, information on the required path direct.movie can be looked up by looking up an entry "direct" in a lower node indicated by an entry "movie" of a root node in the hash tree.

Figure 6:
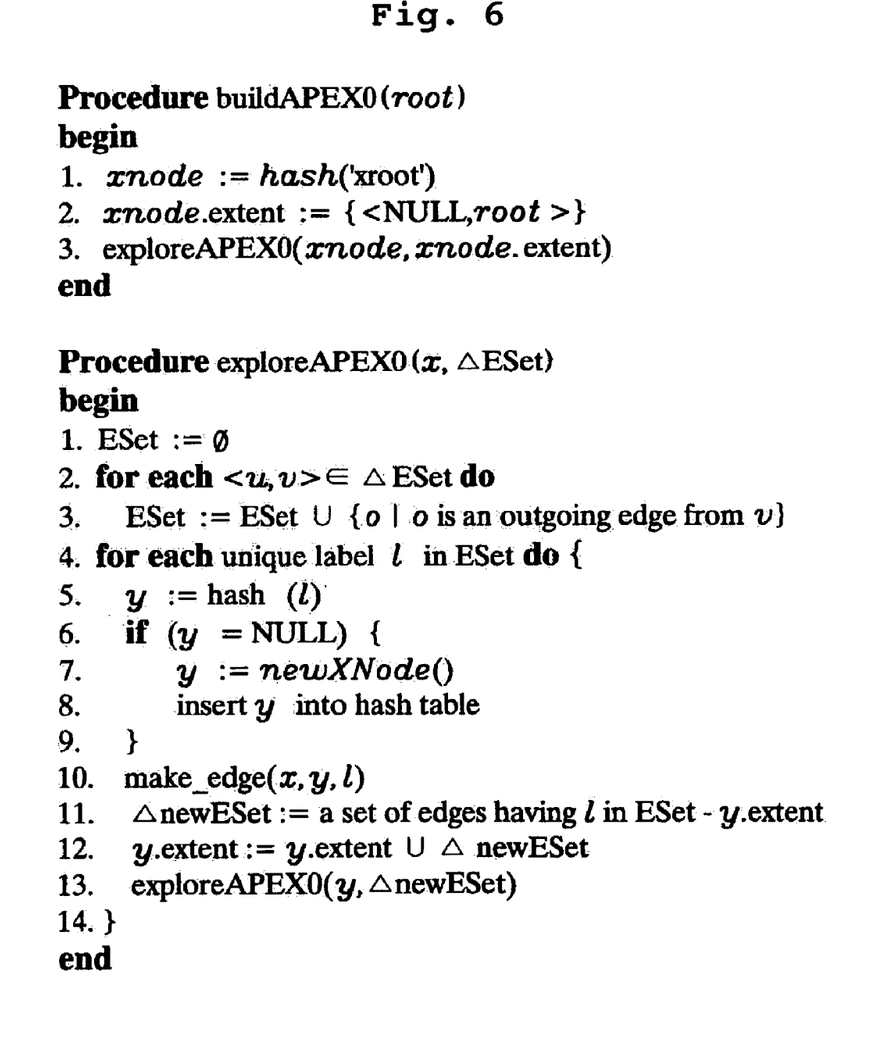
FIG. 6 is a view showing an algorithm of creating an initial APEX.
Figure 7:
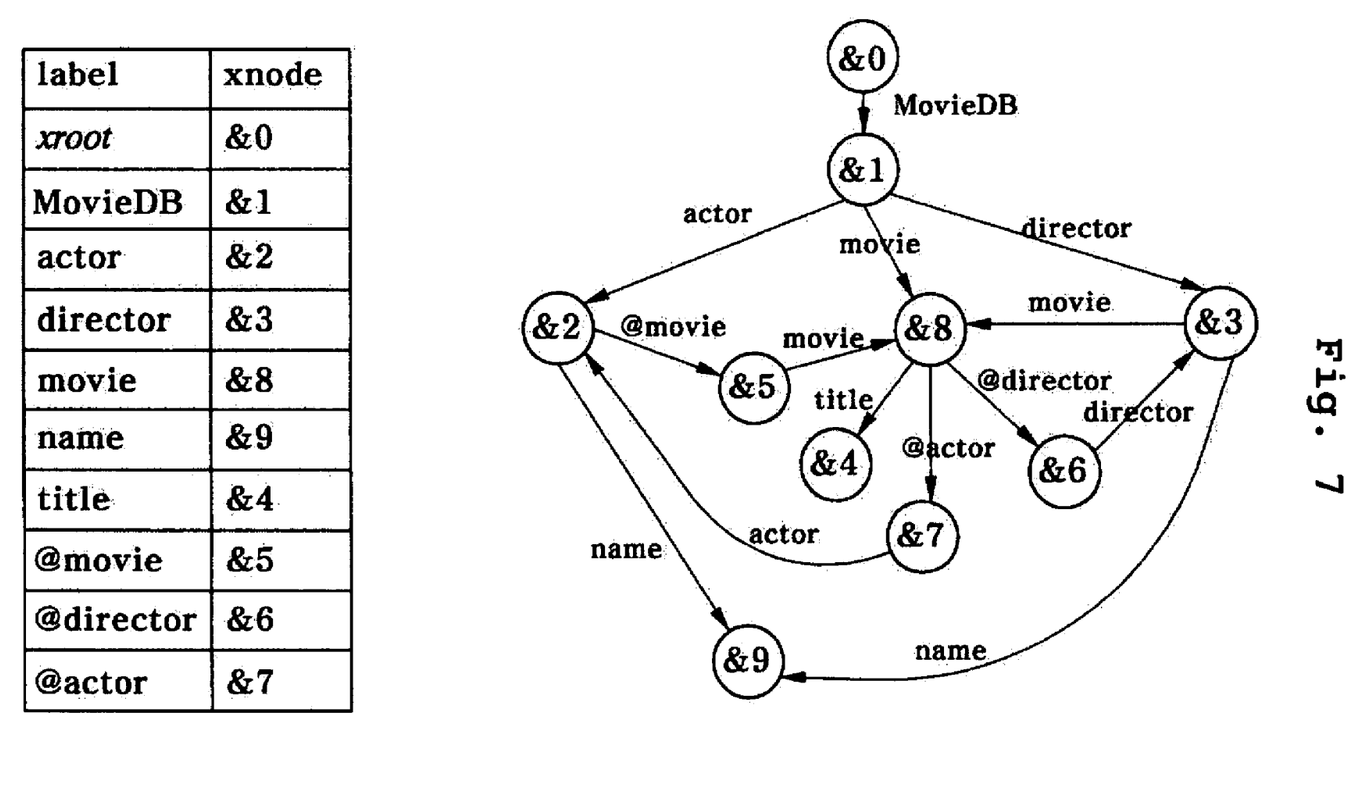
FIG. 7 is a view showing an example of the initial APEX.

In FIG. 6, an algorithm of creating an initial APEX $APEX^0$ is illustrated. FIG. 7 shows the initial APEX $APEX^0$ of FIG. 3. As described above, the APEX consists of a hash tree and a graph structure. Accordingly, the initial APEX $APEX^0$ is constructed as shown in FIG. 7.

The initial APEX creating algorithm of FIG. 6 creates an extent by grouping edges according to labels while traversing the nodes of an XML graph in a depth first traversal manner, creates a node for the creation of the extent on a graph structure, and registers the node in a hash tree. The node for an edge set is created in the initial APEX $APEX^0$, and the node and the label are registered in the hash tree. After the initial APEX $APEX^0$ is created, information on a frequently used path is extracted from a workload and the APEX is continuously updated using this information. With this process, a currently used XML query can be more effectively supported.

The frequently used path extraction module is described below.

Conventional sequential pattern mining algorithms (see M. N. Garofalakis, R. Rastogi, and K. Shim. SPIRIT: Sequential pattern mining with regular expression constraints. VLDB 1999) using an anti-monotonicity property at the step of pruning can be used to extract frequently used paths. However, since the properties of a sequence that is an object of the conventional sequential pattern mining algorithms are different from those of a path, a modification is required. For example, when a sequence (A, B, C) is frequent, it can be stated that all subsequences (A, B), (B, C) and (A, C) of the sequence (A, B, C) are frequent. However, even though a path expression A.B.C is frequently used, it cannot be stated that a path expression A.C is frequently used. The reason for this is that a path A.C is not a subpath of a path A.B.C.

Figure 8:
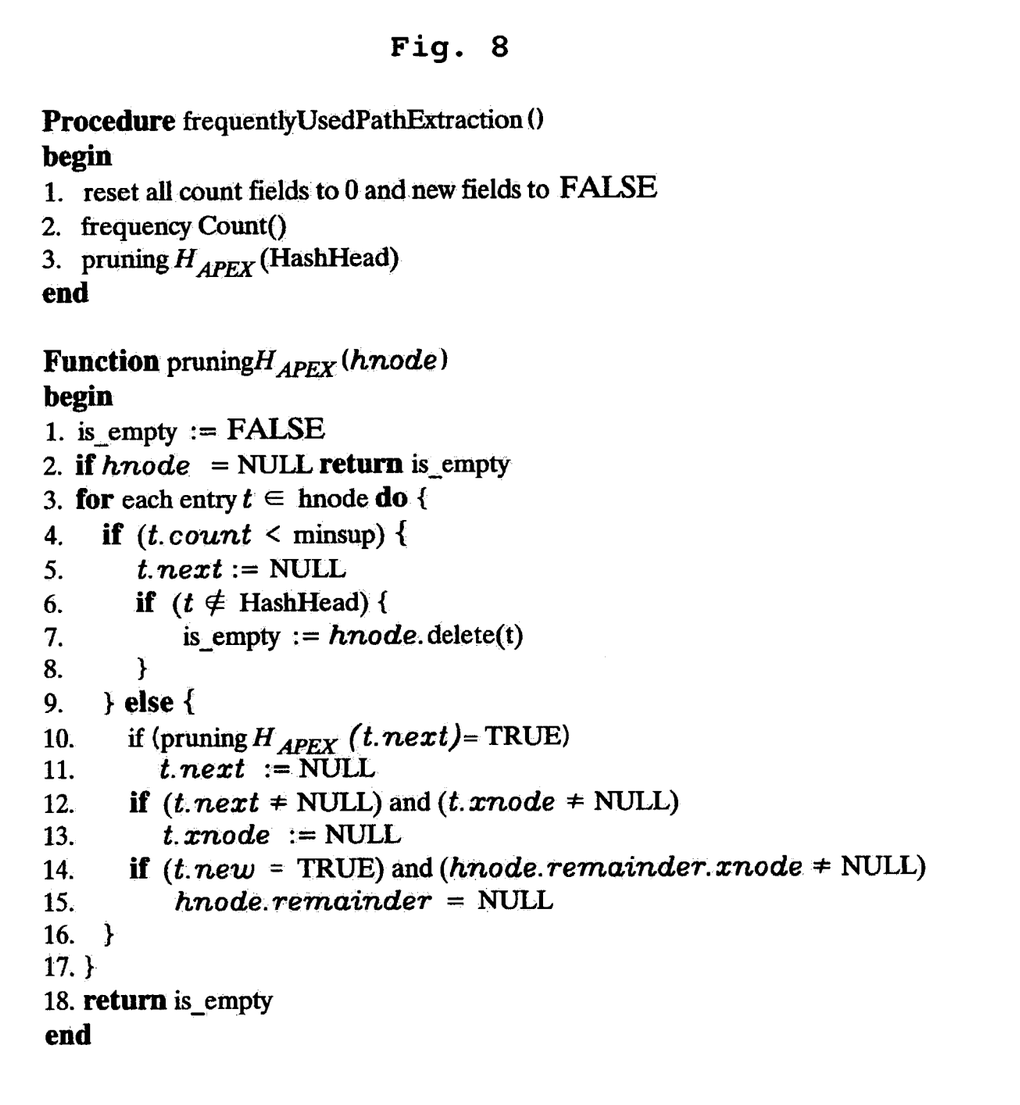
FIG. 8 is a view showing an algorithm of extracting frequently used paths.

Therefore, the present invention provides a frequently used path extraction algorithm as shown in FIG. 8. As shown in FIG. 8, the frequently used path extraction algorithm consists of the steps of counting the frequency and pruning. The hash tree is used to track the changes of the pattern of use of XML queries. After the performance of the frequently used path extraction algorithm is completed, the hash tree maintains only some of given XML path expressions that are information on required paths.

At the step of counting the frequencies of use (supports), the hash tree that is a principal data structure constituting part of an APEX is used so as to extract the frequencies of all paths appearing in a set of path expressions, that is, frequently used paths. In this case, in order to count the frequencies of use of XML path expressions currently used, the "count" and "new" fields of all entries existing in the hash tree are set to 0 and false, respectively. Further, the frequencies of use of all paths appearing in a set of given XML path expressions $Q_{workload}$ are counted. At this step, if a new entry is created in the hash table, a new field of the newly created entry is set to TRUE.

At the step of pruning, entries each having a support smaller than the user-specified minimum support minSup are all removed. In this case, like the sequential pattern mining, information on infrequently used paths is effectively removed from the hash tree using the anti-monotonicity property in which, when sup(p) of a random path p is smaller than minSup, sup(p) of all paths each including p is smaller than minSup.

If information on frequently used paths is extracted from the given path expressions, a current APEX should be updated using the extracted information. For this purpose, a new APEX can be created by re-traversing the XML graph from the beginning. However, this approach requires excessive time and costs, so an APEX updating cost is reduced using the APEX updating algorithm of FIG. 9 in the present invention. The basic scheme of the APEX updating algorithm is to examine whether the nodes of a graph structure are valid with respect to the hash tree, remove invalid nodes and create nodes for newly created entries, while traversing the graph structure of the APEX. Additionally, the extents of newly created nodes are created.

The method of processing an XML query according to the present invention is described below. When a random path $p^i_n = 1_i. \ldots . 1_{n-1}.1_n$ is given as a query, the hash tree is traversed using $p^i_n$. If $p^i_n$ is a required path, a path q having $p^i_n$ as a suffix exists in a hash tree and results $T(p^i_n) = \cup_{\forall q} E(q)$ can be obtained with respect to the extents $E(q)$ of the nodes of a graph structure indicated by the node pointer of an entry corresponding to the path q. If only a path $P^k_n = 1_k. \ldots . 1_n$ (i<k≦n) is looked up in the hash tree, the edge set $T(P^k_n)$ of the path $P^k_n$ is obtained using the path $P^k_n$. A similar step is repeated until a path $P^i_j = 1_i. \ldots . 1_j$ (i≦j≦n) is looked up in the hash tree, that is, an edge set $T(P^i_j)$ is obtained. A target edge set $T(P^i_n)$ can be obtained by joining obtained $T(P^i_j), \ldots, T(P^k_n)$.

For a complex path query $1_i.*.1_j$, query results can be obtained after converting the complex path query $1_i.*.1_j$ into a path set $1_i.1_{i+1}. \ldots . 1_j$ using a query pruning and converting technique (see M. F. Fernandez and D. Suciu. Optimizing regular path expressions using graph schemas. ICDE. 1998.). Value-path mixed queries, such as a query "extract nodes fulfilling a random condition from nodes fulfilling random path expressions," can be processed using various methods, including a method in which nodes fulfilling a random path are extracted through the use of an APEX of the present invention and it is determined whether the nodes fulfill the random path expression," or method in which nodes fulfilling a random condition and nodes fulfilling a path expression are obtained from nodes existing on XML data and the intersection of the two node sets is obtained.

In order to measure the efficiency of the method of the present invention in processing an XML query, tests on various XML queries and XML data were carried out. Actual XML data and the three following XML data generated by an actual DTD were used as test data as described below.

(1) Play: XML document produced by converting Shakespeare's plays into XML forms (source: http://oasis-open.org/cover/xml.html)

(2) FlixML: XML document used as a document for a B-movie guide and having a somewhat complicated structure (source: http://www.xml.com)

(3) GedML: XML document used to represent data of genealogy and having a very complicated structure (source: http://www.oasis-open.org/cover/xml.html, 2001)

Additionally, in order to measure the performance of processing a query for XML data, there are generated data having the various numbers of elements as shown in table 1.

TABLE 1

| Data kind | Play | | | FlixML | | | GedMl | | |
|---|---|---|---|---|---|---|---|---|---|
| Name | four-tragedy.xml | shakes-11.xml | shakes-all.xml | Flix01.Xml | Flix02.xml | Flix03.xml | Ged01.xml | Ged02.xml | Ged03.xml |
| Number of elements | 22791 | 48818 | 179691 | 14734 | 41691 | 335401 | 8259 | 36228 | 381046 |

5,000 single label path expressions, that is, a succession of labels such as $1_i.1_{i+1}. \ldots . 1_j$, 500 complex path expressions having the form of $1_i.*.1_j$, and 1,000 value-path expressions in which path expressions and values were expressed together were used as queries. The single path expression is expressed in the form of $//1_i./1_{i+1}/ \ldots /1_n$ of Xquery that is an XML query standard, the complex path label path expression is expressed in the form of $//1_i//1_j$, and the value-path expression is expressed in the form of $//1_i./1_{i+1}/ \ldots /1_j[\text{text}()=\text{value}]$. Further, the efficiency of the present invention was compared with those of DataGuide (SDG), IndexFabic and APEX$^0$. Further, since the form of the APEX might be changed by the user-specified minimum support minSup, tests were carried out while the value was varied from 0.002 to 0.05. 20% of the single path expressions were used as an XML data query set used to extract frequently used paths.

Figure 10:
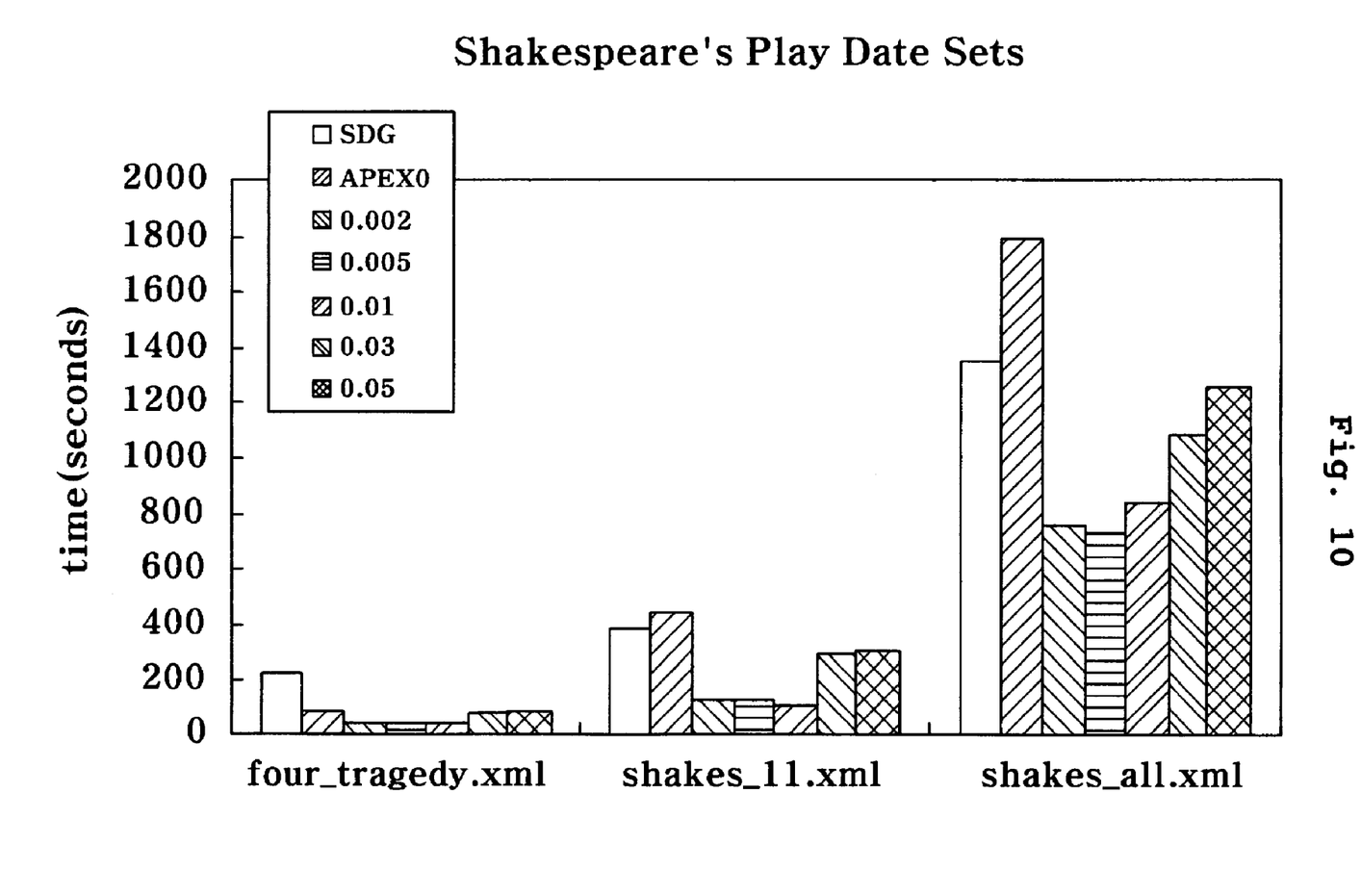
FIG. 10 is a graph showing the performances of single path expressions for Play data.
Figure 11:
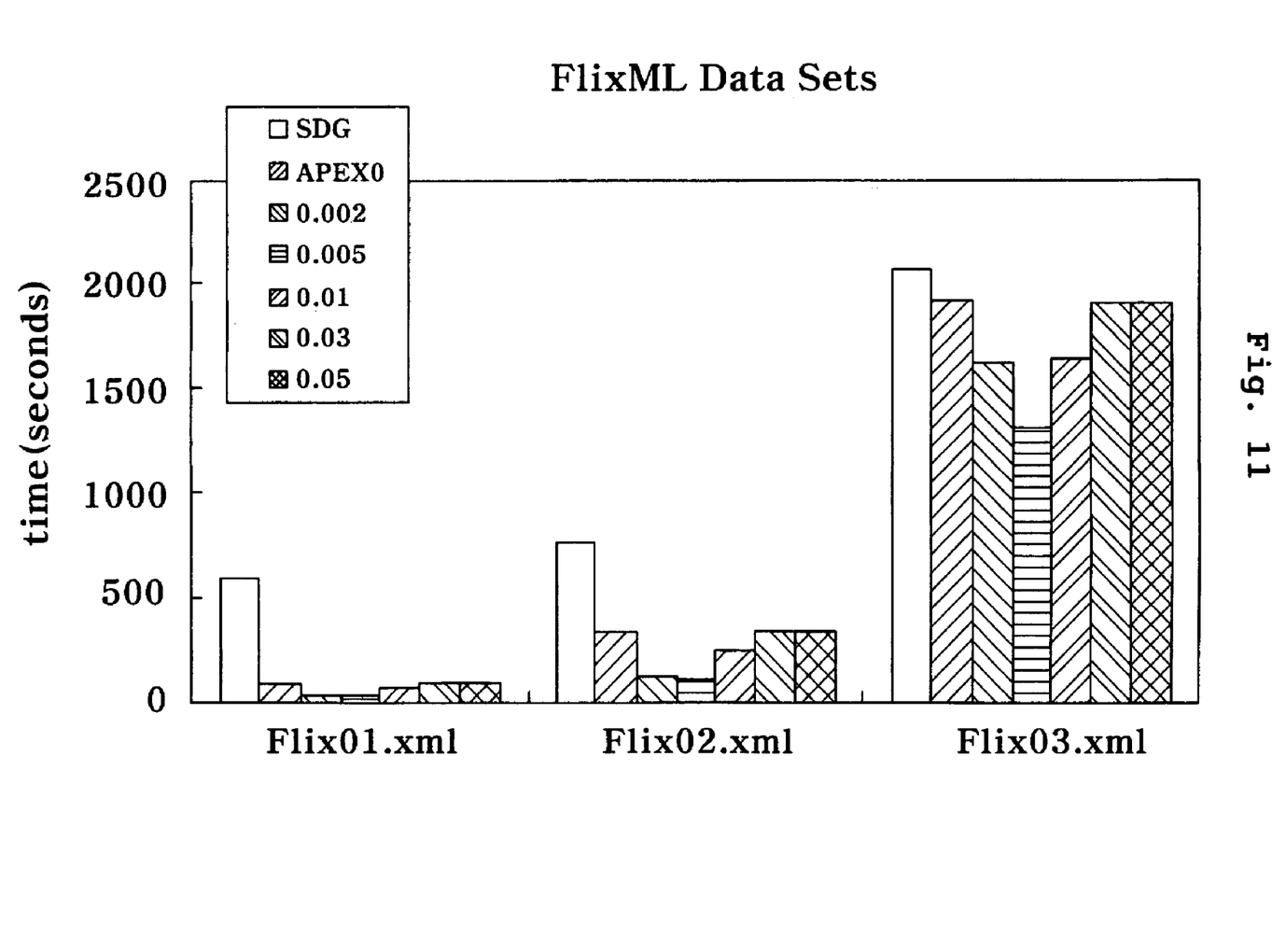
FIG. 11 is a graph showing the performances of single path expressions for FlixML data.
Figure 12:
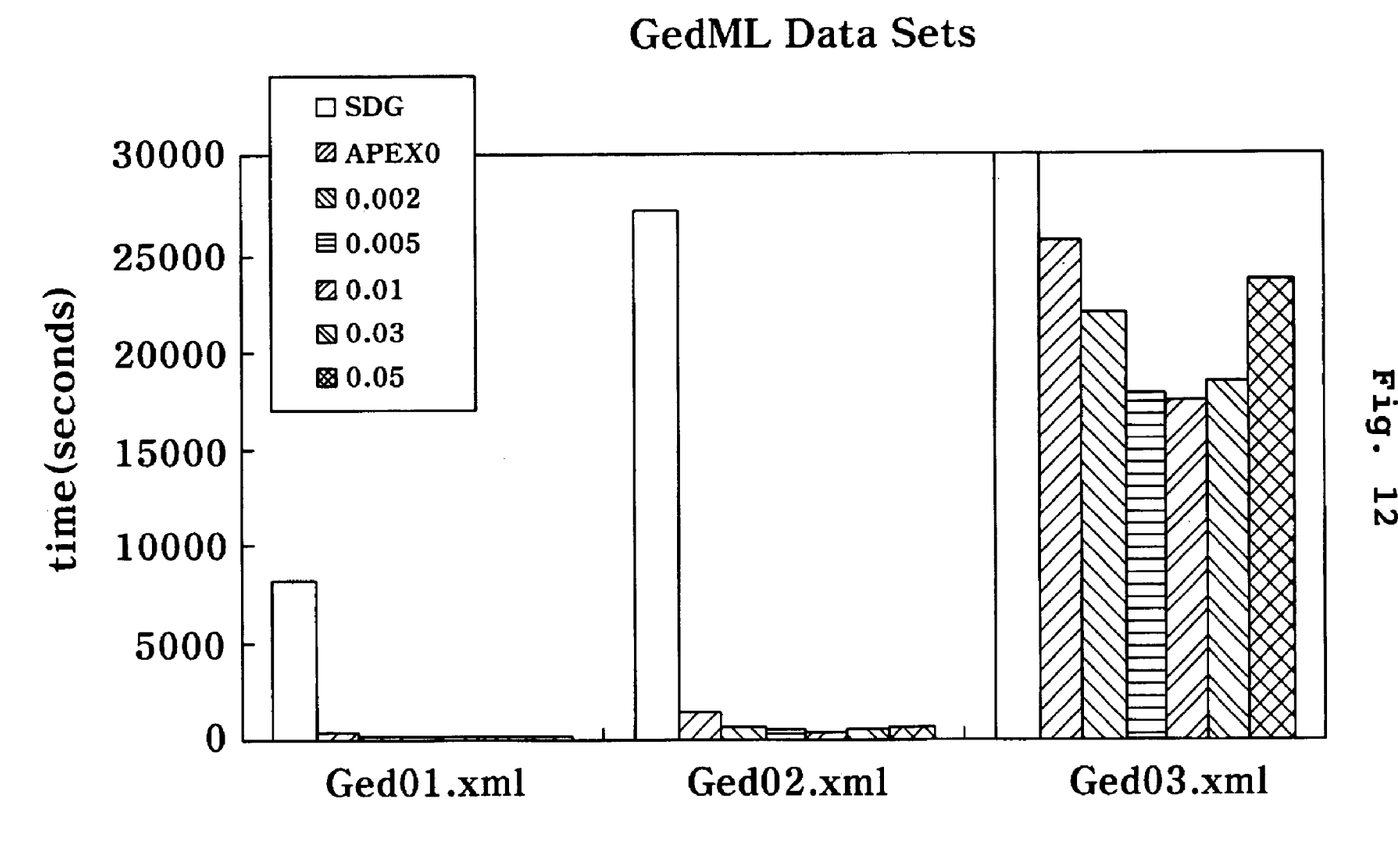
FIG. 12 is a graph showing the performances of single path expressions for GedML data.
Figure 13:
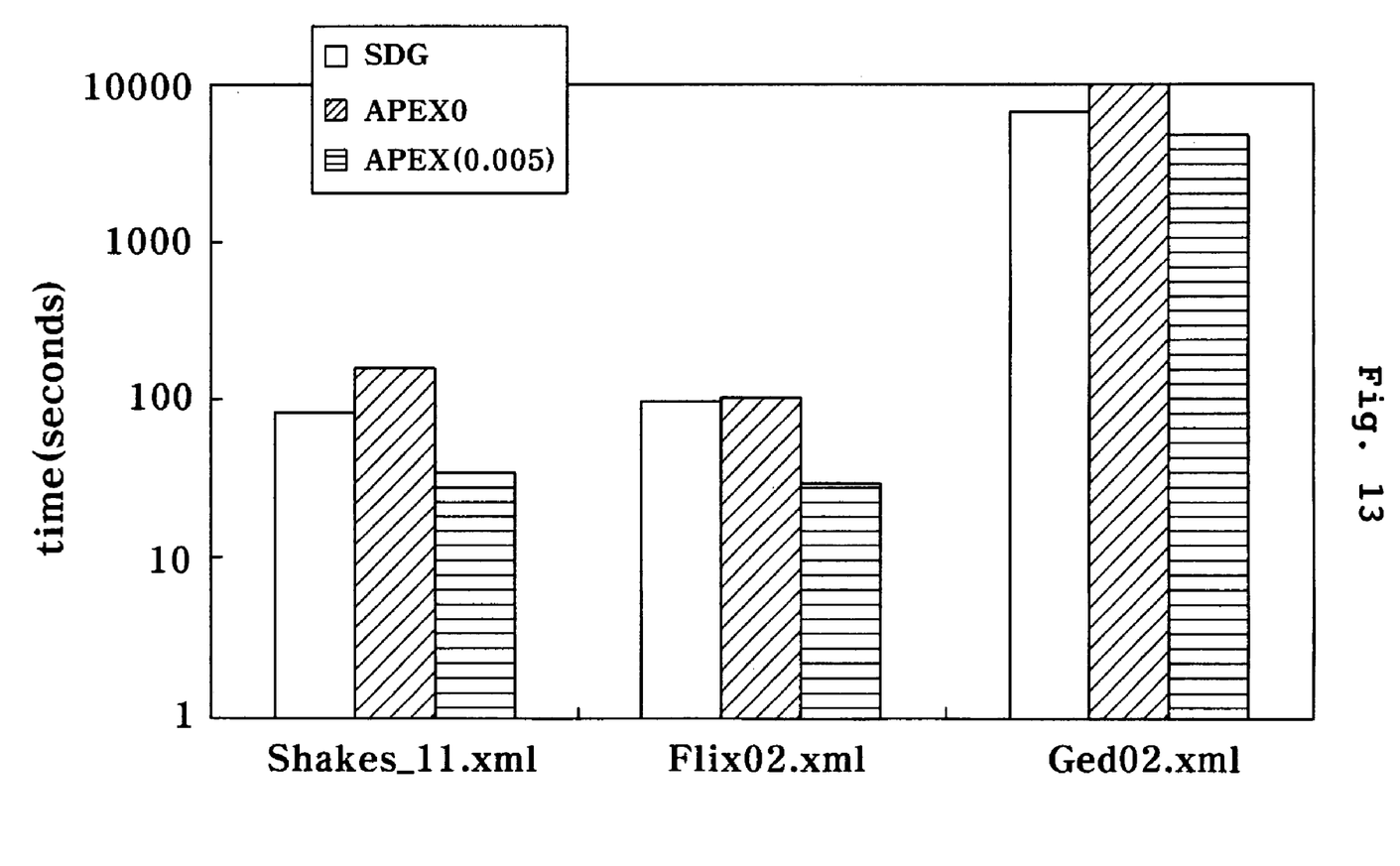
FIG. 13 is a graph comparing the performances of complex path queries.
Figure 14:
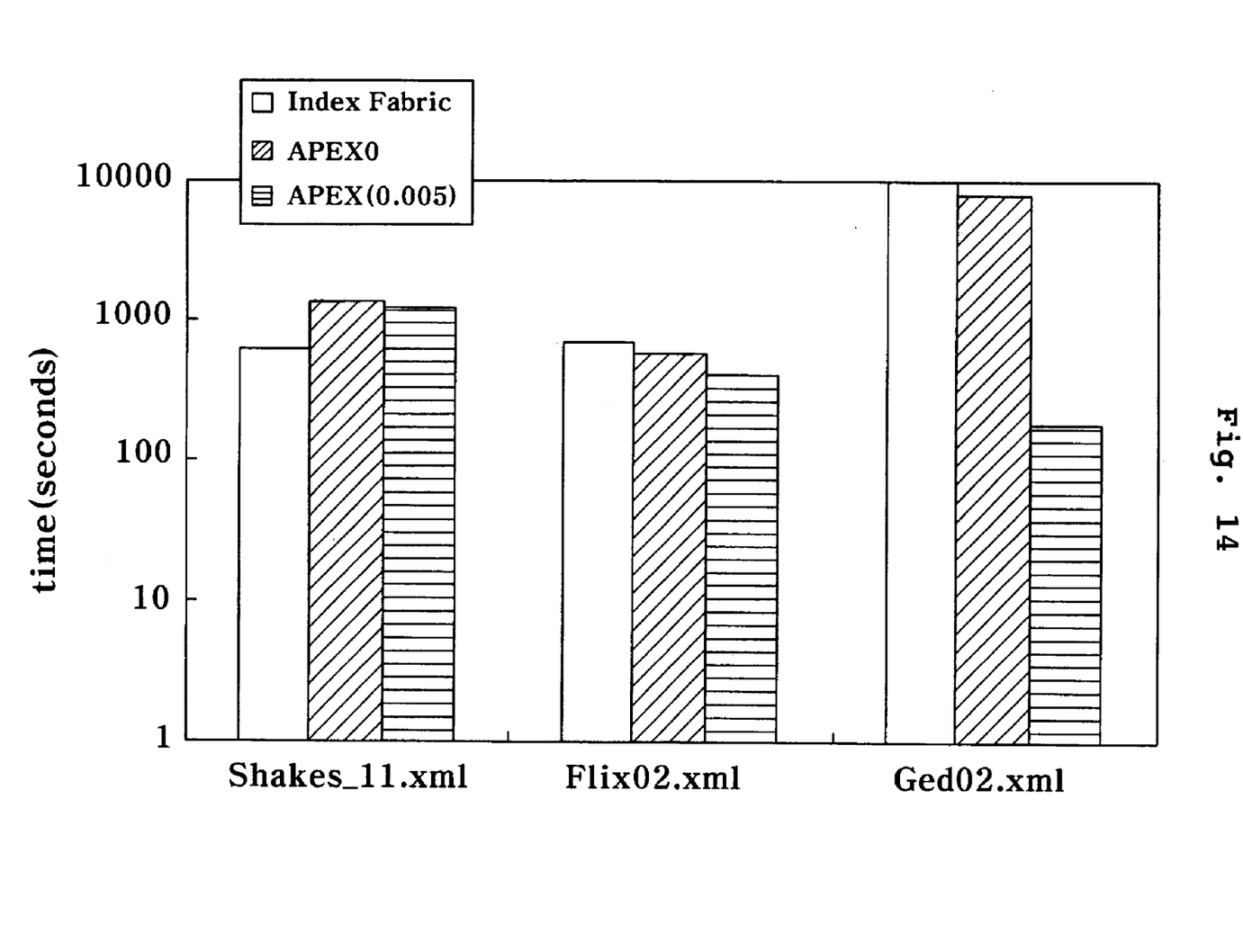
FIG. 14 is a graph comparing the performances of value-path complex queries.

FIGS. 10, 11 and 12 show the times that are required to process 5,000 single path expressions. FIGS. 13 and 14 show the time that is required to process complex path expressions and value-path expressions about shake_11.xml, Flix02.xml and Ged02.xml. In FIG. 12, the performance of SDG of Ged03.xml is about 125000 seconds, and in FIG. 13, the performance of APEXO of Ged02.xml is about 210000.

As the structure of XML data becomes more complicated, the performance of the APEX increases further. In the case of DataGuide or Index Fabric, all paths starting from the root of XML data are maintained. That is, as the structure of XML data becomes more complicated, the number of paths increases, and consequently the amount of information that must be traversed when a query is processed increases. In contrast, the APEX maintains only information of frequently used paths, so it can effectively process a query.

Further, the user-specified minimum support minSup influences the performance of processing the query. As the user-specified minimum support minSup becomes smaller, the number of frequently used paths increases. However, as shown in FIGS. 10 to 12, even though the number of frequently used paths increases, the performance of processing the XML query is not always improved. The reason for this is that, as the structure of a path index becomes complicated, a region to be traversed increases, and consequently the performance of traversal is deteriorated more. In the above-described tests, when the user-specified minimum support minSup was 0.005, the APEX exhausted greatest performance.

As described above, the present invention provides a method of processing a query about XML data using the APEX, which is capable of effectively obtaining query results using frequently used paths through the use of the APEX when looking up XML data. Further, the method of the present invention reduces a burden of updating an index to reflect the change of the index when the pattern of XML queries is changed. Accordingly, the method of the present invention can be applied to the fields of using XML data, such as electronic commerce and Internet document search.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of processing a query about Extensible Markup Language (XML) data in a processing system, comprising:
    the first step of representing the XML data in the form of an XML graph;
    the second step of creating and updating an Adaptive Path indEX (APEX) based on used paths extracted from a previously processed XML queries and the XML graph; and
    the third step of processing an XML query using the APEX;
    wherein the APEX has a graph structure, each of nodes of the graph structure having an extent instead of an edge set of required paths;
    upon the system determining that a set of paths starting from a root are $Q_{XML}$ and a set of required paths each having a support greater than a user-specified minimum support or defined as a path having a length of 1 is R, the extent with respect to a path p is defined as $E(p) = \cup_{r \in Q(p)} T(r)$, where $T(r)$ is an edge set for a path r, $Q(P) = Q_G(P) - Q_A(P)$ and, with respect to a path p, $Q_G(p) = \{l | l \in Q_{XML}$ and p is a suffix of $l\}$ and $Q_A(P) = \{l | l \in Q_{XML}$ and every path q $(\neq p) \in R$ having p as a suffix is a suffix of $l\}$,
    where p, q and r are each a path; $Q_{XML}$, $Q(p)$, $Q_G(p)$ and $Q_A(P)$ are a set of paths; $E(p)$ is the extent; and, $T(r)$ is an edge set for the path r; and, $E(p) = \cup_{r \in Q(p)} T(r)$ is a union of a plurality of $T(r)$ where r is in $Q(p)$; and
    displaying the APEX.

2. The method as set forth in claim 1, wherein the first step is performed by generating the XML graph in such a way that a relationship between an ID of the XML data and an IDREF type attribute is represented by an edge extending from an IDREF type node to a node representing an element having a corresponding ID type attribute, a label of the edge is adapted to have a label of the element, and a label of an edge indicating the IDREF type node is represented to be distinguished from labels of other edges.

3. The method as set forth in claim 1, wherein the second step is performed in such a way that the APEX is created by creating an initial APEX representing information on a structural summary of the XML graph, extracting paths used more than a user-specified minimum support from a workload that is a path expression set of previously processed XML queries, and updating the initial APEX to include only the used paths, and the APEX is continuously updated.

4. The method as set forth in claim 2, wherein the second step is performed in such a way that the APEX is created by creating an initial APEX representing information on a structural summary of the XML graph, extracting paths used more than a user-specified minimum support from a workload that is a path expression set of previously processed XML queries and updating the initial APEX to include only the used paths, and the APEX is continuously updated.

5. The method as set forth in any of claims 1 to 4, wherein the APEX further comprises a hash tree, the hash tree comprising a count field for representing the frequency of use, a new field for representing whether a corresponding node is a newly created node, an xnode field for indicating the node of the graph structure and a next node for indicating a next node, the fields being continuously updated to reflect the variation of the workloads.

6. The method as set forth in claim 5, wherein the updating of the APEX is performed by eliminating at least some used nodes and adding newly generated nodes to the graph structure while traversing the graph structure of the APEX and examining the entries of the hash tree with respect to each of the nodes.

* * * * *